(12) United States Patent
Isaacks et al.

(10) Patent No.: US 8,519,276 B2
(45) Date of Patent: Aug. 27, 2013

(54) SECURE RAISED ACCESS FLOOR SERVICE BOX AND SYSTEM

(75) Inventors: Scott J. Isaacks, Seattle, WA (US); Steven M. van Beveren, Kelowna (CA)

(73) Assignee: Dirtt Environmental Solutions, Ltd., Calgary (CA)

( * ) Notice: Subject to any disclaimer, the term of this patent is extended or adjusted under 35 U.S.C. 154(b) by 225 days.

(21) Appl. No.: 13/114,762

(22) Filed: May 24, 2011

(65) Prior Publication Data

US 2012/0068583 A1   Mar. 22, 2012

Related U.S. Application Data

(63) Continuation-in-part of application No. 29/375,177, filed on Sep. 17, 2010, now Pat. No. Des. 638,367, and a continuation-in-part of application No. 13/013,760, filed on Jan. 25, 2011, now abandoned.

(51) Int. Cl.
*H02G 3/08* (2006.01)

(52) U.S. Cl.
USPC .............. 174/486; 165/287; 439/134; 70/387

(58) Field of Classification Search
USPC ................... 165/104.33, 176, 185, 202, 287; 361/679.01, 679.09, 679.27, 679.53, 679.54, 361/679.47, 679.48, 679.49, 679.37, 695, 361/698, 699, 672; 439/304, 350, 49, 134, 439/721, 373, 607.01; 312/109, 215, 242, 312/209, 228, 223.2, 405; 174/58, 559, 520, 174/38, 50, 669, 135, 652, 92, 486; 70/252, 70/368, 451, 387
See application file for complete search history.

(56) References Cited

U.S. PATENT DOCUMENTS

| D260,878 S | 9/1981 | Dolinar |
| 4,381,063 A | 4/1983 | Leong |

(Continued)

FOREIGN PATENT DOCUMENTS

| JP | 2002118937 | 4/2002 |
| JP | 3334621 | 8/2002 |

(Continued)

OTHER PUBLICATIONS

National Security Telecommunications and Information Systems Security Instruction (NSTISSI No. 7003). Dec. 13, 1996. "Protective Distribution Systems (PDS)." NSTISSI No. 7033. 13pp. See pp. 7-8 (Annex B) specifically.

(Continued)

*Primary Examiner* — Hung Duong
(74) *Attorney, Agent, or Firm* — Workman Nydegger (57) ABSTRACT

A raised access floor service box can have a plurality of entry points that are segregated from one another. Each of the plurality of entry points can be associated with a corresponding plurality of segregated chambers. At least one of the segregated chambers can be configured to be a secure chamber, which further can include a door to the chamber. The door to the secure chamber can include a lock that secures and prevents the door from opening when the lock is in a locked position, thus securing the cables and cable connections within the security chamber. In addition, the raised access floor service box can have connector ports that are only accessible within the security chamber. The raised access floor service box thus allows for various types of cables, with various levels of security, to be associated with a single raised access floor service box.

20 Claims, 6 Drawing Sheets

(56) References Cited

U.S. PATENT DOCUMENTS

| | | | |
|---|---|---|---|
| 4,596,095 | A | 6/1986 | Calfant |
| 4,721,476 | A | 1/1988 | Zeliff |
| 5,052,157 | A | 10/1991 | Ducroux |
| 5,057,647 | A | 10/1991 | Bogden |
| D324,207 | S | 2/1992 | Nieves |
| 5,272,297 | A | 12/1993 | Reichow |
| 5,285,009 | A | 2/1994 | Bowman |
| D354,736 | S | 1/1995 | Hallett |
| D367,859 | S | 3/1996 | Beaumont |
| 5,575,668 | A | 11/1996 | Timmerman |
| 5,749,188 | A | 5/1998 | Belbenoit |
| 5,907,127 | A | 5/1999 | Daoud |
| 5,933,563 | A | 8/1999 | Schaffer |
| 5,945,633 | A | 8/1999 | Ott |
| D422,265 | S | 4/2000 | Noble |
| 6,102,229 | A | 8/2000 | Moncourtois |
| D437,586 | S | 2/2001 | Sonntag |
| D450,666 | S | 11/2001 | Scribner |
| D463,775 | S | 10/2002 | Byrne |
| D472,213 | S | 3/2003 | Byrne |
| 6,621,975 | B2 | 9/2003 | Laporte |
| D516,513 | S | 3/2006 | Kissinger |
| 7,045,706 | B1 | 5/2006 | Lincoln |
| 7,121,853 | B1 * | 10/2006 | Gast ............................ 439/134 |
| D539,762 | S | 4/2007 | Johnson |
| 7,270,562 | B1 | 9/2007 | Trout |
| D560,609 | S | 1/2008 | Rosenthal |
| D626,069 | S | 10/2010 | Byrne |
| 8,153,910 | B1 * | 4/2012 | Penczak ........................ 174/486 |
| 2002/0195261 | A1 | 12/2002 | Harrison |
| 2006/0221622 | A1 * | 10/2006 | Howell ......................... 362/375 |
| 2006/0233355 | A1 | 10/2006 | Markiewicz |
| 2007/0077800 | A1 | 4/2007 | Isaacks |
| 2008/0057758 | A1 | 3/2008 | Walter |
| 2008/0131132 | A1 | 6/2008 | Solheid |
| 2009/0205864 | A1 | 8/2009 | McCarthy |
| 2010/0037554 | A1 * | 2/2010 | Oh ............................. 52/745.21 |
| 2010/0051308 | A1 | 3/2010 | Hansen |
| 2011/0181163 | A1 * | 7/2011 | Han et al. ...................... 312/405 |

FOREIGN PATENT DOCUMENTS

| | | |
|---|---|---|
| JP | 2005102429 | 4/2005 |
| KR | 2020090001720 | 2/2009 |
| KR | 100969193 | 7/2010 |

OTHER PUBLICATIONS

SMED International, nd. "Stay on top of your technology." 28 pp.

Notification of Transmittal of the International Search Report and the Written Opinion of the International Searching Authority, or the Declaration; Feb. 27, 2008, 7 pages.

International Search Report and Written Opinion for PCT/US2012/033378 mailed Oct. 30, 2012.

International Search Report and Written Opinion for PCT/US2012/065920 mailed Feb. 28, 2013.

International Search Report and Written Opinion for PCT/US2012/038390 mailed Dec. 18, 2012.

* cited by examiner

SECURE RAISED ACCESS FLOOR SERVICE BOX AND SYSTEM

RELATED APPLICATION DATA

This application is a continuation-in-part of U.S. Design patent application Ser. No. 29/375,177, filed on Sep. 17, 2010. This application is also a continuation-in-part of U.S. patent application Ser. No. 13/013,760, filed on Jan. 25, 2011, which also claims the benefit of priority to U.S. Design patent application Ser. No. 29/375,177. The entire content of each of the aforementioned patent applications is incorporated by reference herein. This application also incorporates the entire content of U.S. Provisional Patent Application No. 61/293,102, filed Jan. 7, 2010.

BACKGROUND OF THE INVENTION

1. Technical Field

The present disclosure relates generally to devices, methods, and systems for securing network cabling or connectors.

2. Background and Relevant Art

Security concerns in data and communication infrastructures have increased in importance as more individuals, businesses, government, and military organizations increase reliance on data and communication networks. For example, both government and military agencies have adopted physical security standards for sensitive information facilities, such as the DCID 6/9, NSTISSI, which is hereby incorporated in its entirety. A substantial aspect of securing data and communication network infrastructure is to secure the cabling and cabling connections needed to form the data and communication networks.

Communication devices, including for example, computers, telephones, fax machines and other devices, often receive and transmit information through cables. Fiber optic cables, copper cables, and other communication cables may carry information to and from these communication devices. Cable boxes are often used as connection points to organize and separate cables within a communication network. Most office buildings have at least one cable box between the point at which a data cable enters a building and the point at which a data cable terminates at a communication device.

Cable boxes can include, for example, consolidation boxes and service boxes. Consolidation boxes can be located in a ceiling, floor, or within a wall, and can provide network access and service to many different end users. Cable bundles commonly referred to as "trunk lines" or "primary cables" are thick and can contain many individual cable strands. Primary cables may enter into a consolidation box and be separated and distributed to several different service boxes. Specifically, the consolidation box may separate primary cable bundles are into smaller bundles or individual cables, which are commonly referred to as "branch lines" or "secondary cables."

Service boxes can also be located in a ceiling, or a floor, or within a wall. Unlike consolidation boxes, service boxes may service a single end user or a small number of end users. Secondary cables from a consolidation box may enter into a service box through a designated entry point. A service box may also receive power cables through a designated entry point. A network architect can secure connector modules to the ends of these secondary cables and power cables. These connector modules may contain one or more connector ports. For example, a power outlet, a phone jack, or another connector port may be located on a connector module within a service box. These connector ports can be compatible with cable plugs that are secured to the ends of cables that that connect directly to communication devices.

Since conventional communication cables terminate, connect, and/or divide within cable boxes, including both consolidation boxes and service boxes, these cable boxes are an important component in maintaining a secure data and communications infrastructure. For example, network maintenance may demand access to a consolidation or service box to enable reconfiguration of the cabling located within. At the same time, security concerns may demand that only authorized personnel have access to the cable boxes. Moreover, some facilities may have multiple data and/or communication networks. In such a case, each network may have different security classifications requirements that may demand various levels of access from different groups of authorized personnel.

In order to maintain security, conventional cable boxes (including both consolidation boxes and service boxes) are typically configured with the capacity to accept only one type of classified network. Thus, a facility with several different levels of classified networks may need separate cable boxes for each of the classified networks. In this situation, a large number of cable boxes may be required in order to maintain security for each of the disparate network classifications.

In addition to the obvious increase in cost created by the large number of cable boxes, the amount of additional interior space required to accommodate each of the cable boxes also substantially increases. Depending on the design of a particular facility, it may become difficult or impossible to accommodate the required boxes that may be needed by each individual network type or security classification.

Conventional cable boxes may be limited to data and not accept power cables. For example, conventional cable boxes may call for a separate electrical power infrastructure to be run independently to each individual cable box. Thus, an increase in cable boxes may also result in additional electrical power cables and additional electrical power service boxes. The additional electrical power infrastructure that may be required by conventional cable boxes increases the cost, and further limits the amount of interior space to accommodate the network infrastructure.

In addition to the above identified issues, which are common to cable boxes in general, raised access floor service boxes in particular can present unique challenges. First, due to size constraints, conventional raised access floor service boxes may only be able to accommodate a limited number of connector ports and may not be compatible with fiber optic cables. Because of this, multiple raised access floor service boxes may be needed to provide a required number of connector ports. Second, it may not be possible to preload conventional raised access floor service boxes. If a box cannot be preloaded, the connector modules within the box may need to be wired and installed by a network architect after receipt of the service box.

Third, conventional raised access floor service boxes may be configured to have cables or cable bundles entering or exiting the box on different sides. This may present a problem during installation as conventional raised access floor service boxes are often the same size as a standard floor tile. Thus, if wires or bundles of wires enter or exit the box on different sides, a network architect installing the box may need to remove several floor tiles in order to install. Finally, some conventional raised access floor service boxes may be susceptible to tampering because screw heads are exposed or the box is not secure in some other way.

Thus, there is an increased need in the industry for cable boxes, in particular raised access floor service boxes, that provide secure access to a variety of network types of classifications.

BRIEF SUMMARY OF THE INVENTION

Example implementations of the present invention overcome one or more of the problems that currently exist in the art. Specifically, the present invention provides a raised access floor service box that can collect and distribute power and data cables that have disparate levels of security. For example, according to the present invention, the space within a service box can be divided between one or more chambers dedicated to confidential information and one or more chambers dedicated to non-confidential information or power. Doors, configured to cover the chambers of a service box, can be locked in order to prevent unauthorized people from accessing confidential information. Thus, the present invention can eliminate the need for multiple service boxes where access to power and/or data networks having differing levels of security is required.

For example, in one implementation of the present invention, a service box is configured to be mounted within a raised access floor. The service box comprises a housing that at least partially defines a space, the housing having at least one cable entry point and at least one cable exit point. The service box also comprises a separation member positioned within the housing that divides the space defined by the housing into at least two chambers, at least one of the chambers being a secure chamber and each chamber being accessible by at least one cable entry point and at least one cable exit point. The service box further comprises a door operatively associated with the housing and configured to provide human access to at least the secure chamber. The service box additionally includes a locking device that is operatively associated with the door providing access to the secure chamber, the locking device being configured to prevent human access to the secure chamber when the locking device is in a locked position.

In another implementation of the present invention, a system for providing limited human access to a service box mounted within a raised access floor includes a first cable that is located in an interior space of a ceiling, floor or wall that has a confidential security classification. The system further includes a second cable also located in an interior space of a ceiling, floor or wall that has a non-confidential security classification. The system also includes a service box. The service box includes a housing that at least partially defines a space and a separation member that is positioned within the housing to divides the space defined by the housing into a secure chamber and a non-secure chamber. A secure entry point is configured to allow the first cable into the secure chamber and a non-secure entry point is configured to allow the second cable into the non-secure chamber. The service box also includes a lockable door that is configured to provide access to at least the secure chamber.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE EXAMPLE EMBODIMENTS

The present invention provides a raised access floor service box that can collect and distribute power and data cables that have disparate levels of security. For example, according to the present invention, the space within a service box can be divided between one or more chambers dedicated to confidential information and one or more chambers dedicated to non-confidential information or power. Doors, configured to cover the chambers of a service box, can be locked in order to prevent unauthorized people from accessing confidential information. Thus, the present invention can eliminate the need for multiple service boxes where access to power and/or data networks having differing levels of security is required.

In addition to these security benefits, the present invention also provides a service box that can be pre-loaded with wires and connector modules for fast and easy installation within a raised access floor. For example, all entry points on a service box according to the present invention can be located on the same side of the service box. Also, connector modules that are usable in the present invention can easily be exchanged for other connector modules. These and other features of the present invention provide a service box that is versatile and user-friendly.

As used herein, a cable box can include any box, panel, outlet, or container that can be used as a point of connection, distribution, or junction within a data and communication network and/or electrical power infrastructure. Cable boxes include, but are not necessarily limited to, service boxes that are configured to fit within a raised access floor. Service boxes may provide power or data connections for an individual user or a small number of users.

As used herein, "cables" refer to any wire, cord, or other line that can be used as a communication medium or electrical transfer medium. For example, communications cables can include Ethernet, fiber optic, electrical, telephone or any other communication or electrical cable in any form or standard. "Cables," as used herein, can also refer to a single wire, cord, or other line or, alternatively, a bundle of two or more wires, cords, or other lines. For example, a secondary cable may comprise a bundle of multiple wires, cords, or lines. A communication device cable may comprise a single wire, cord, or line.

In general, cable boxes can be used to interconnect various portions of a communication network. For instance, a network architect might use a distribution box to provide an interconnection between large data cables, such as primary cables, and smaller data cables, such as secondary cables. A network architect might use a service box to provide an interconnection between secondary cables and individual lines that attach directly to a communication device. A network architect might also use a service box to provide a connection between large power cables and an individual power lines that provide electrical power to a communication device.

The physical location of a service box can vary from one implementation to the next. For example, in some commercial and residential spaces, a removable tile floor may rest on a frame or other structure above a true floor. Individual floor tiles can have different sizes and dimensions, but, in conventional cases, are often twelve inches by twelve inches. A network architect may use the space above a true floor and below a tile floor to install one or more service boxes. In other example implementations, a network architect may install a service box above a suspended ceiling, within a wall, or at another area where access to a communication network and/or electrical power is required. A network architect can cover a service box with a removable floor, ceiling, or wall panel such that the box is at least partially hidden from plain view. In other implementations, panels do not cover the service box, and as such, the service box remains in plain view within the floor, ceiling, or wall.

Service boxes mounted within a raised access floor can be desirable for several reasons. For example, a network architect can install a raised access floor service box proximate to a desk or other piece of furniture that supports a communication device. This furniture can be used to hide cables that run from the service box to the device. For example, cables from the service box can be threaded up through a space within a desk and directly to the communication device. This can help to eliminate the cluttered look that can result from having multiple cables in plain view.

Although the location is convenient, a network architect may want to limit access to all or parts of a service box due to security concerns. For example, a service box may provide access to both confidential and non-confidential networks. In this situation, a network architect may need to install at least two different service boxes: one providing limited access to the confidential network(s), and another providing general access to the non-confidential network(s). According to one implementation of the present invention, a network architect could provide limited access to the confidential networks and general access to the non-confidential networks, while at the same time providing the convenience and efficiency of a single service box.

Figure 1:
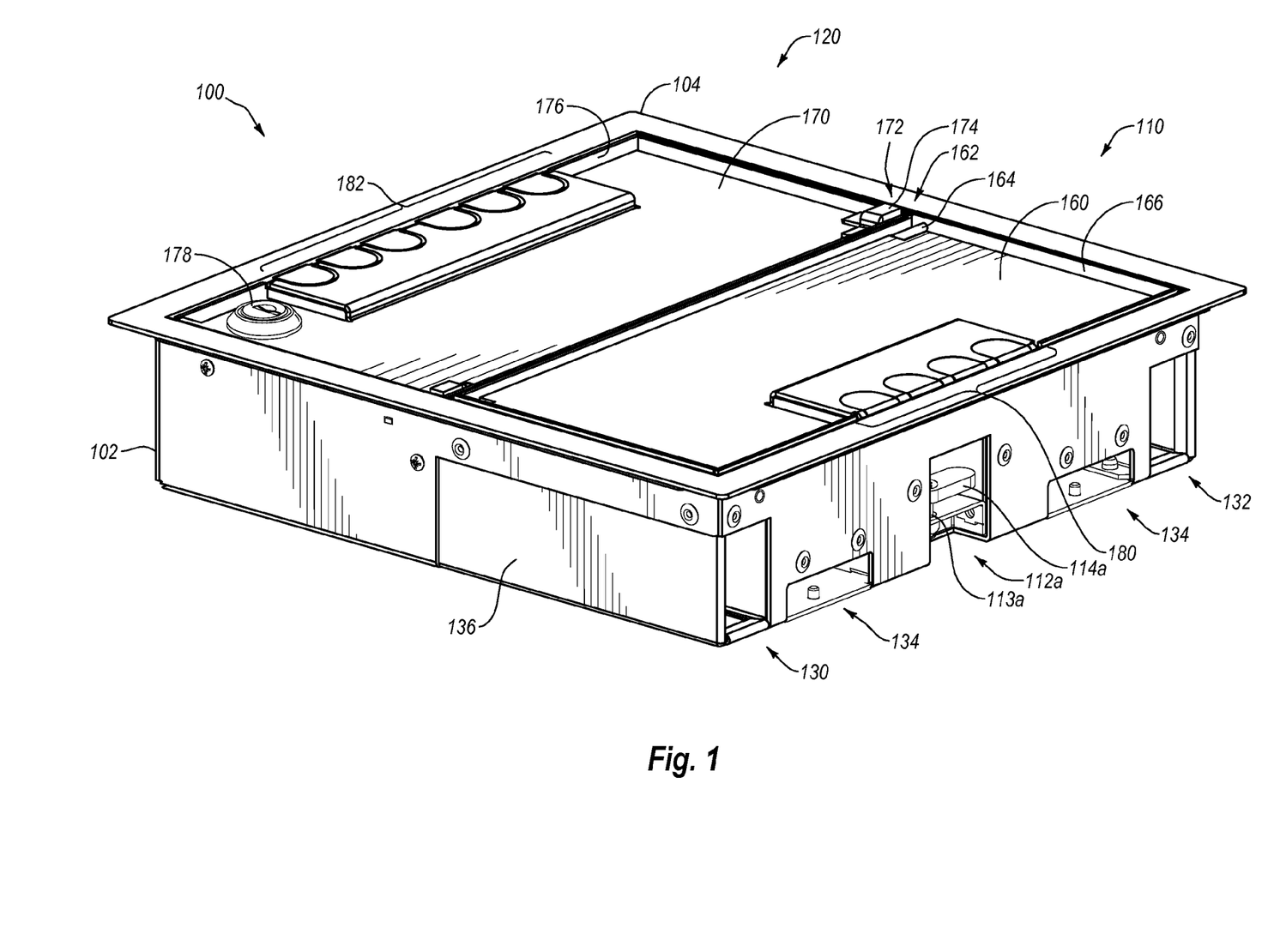
FIG. 1 illustrates a perspective view of a raised access floor service box according to the present invention wherein the doors on the service box are in a closed position.

FIG. 1 illustrates a raised access floor service box 100. Raised access floor service box 100 includes a housing 102 that generally forms a box or container. Housing 102 can be made out of aluminum, steel, or another material of similar strength. Housing 102 has a substantially square configuration. However, in other implementations, housing 102 can form other shapes or configurations, depending on the specific use, or the desired installation location for the service box 100.

Just as the general shape configuration of the housing 102 can vary, so too can the size of the housing 102. In one example implementation, the housing 102 has a length and width of about eleven inches, and a height of about two and a half inches. A taller or wider housing may be desirable if a large number of connector ports or power outlets are required and there is sufficient space between a true floor and a removable tile floor. For example, in one embodiment housing 102 can have a height of about five inches.

Housing 102 illustrated in FIG. 1 also includes a lip portion 104. Lip portion 104 can provide a surface from which service box 100 can hang when mounted about a support surface, such as a floor. For example, lip portion 104 can rest directly on one or more removable floor tiles, or the lip portion 104 can rest on another structure that is elevated above a true floor. In one embodiment, all four sides of service box 100 can include a lip portion 104. In alternative embodiments, the lip portion may not exist on all sides of a service box. For example, a lip portion may be limited to two opposing sides of a service box.

Figure 6:
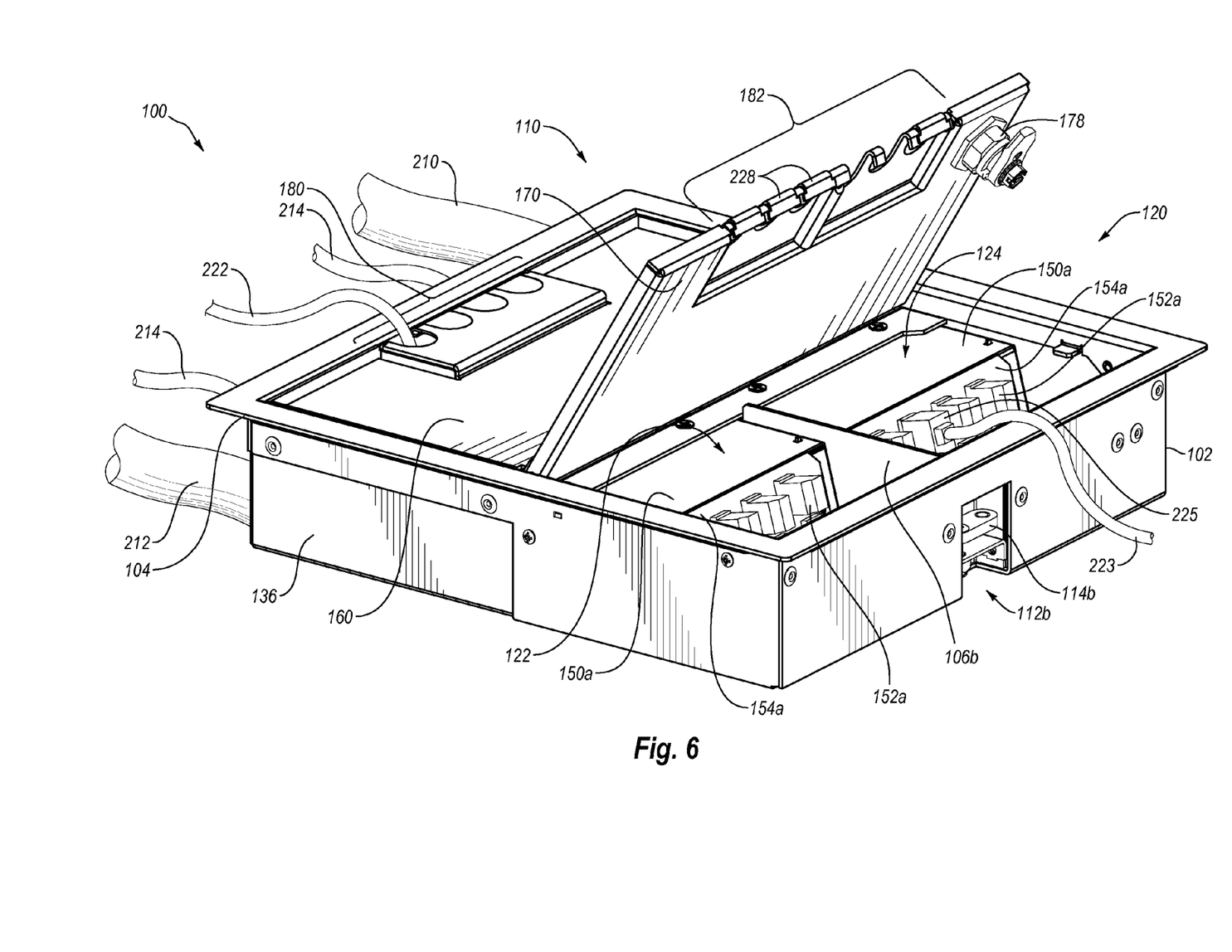
FIG. 6 illustrates a perspective view of the raised access floor service box shown in FIG. 1, and oriented 180° with respect to FIG. 5, with a secure door in an open position and with cables entering and exiting the service box.

Housing 102 can further comprise opposing mounting brackets 112 (e.g., FIG. 1, 112a and FIG. 6, 112b). Mounting brackets 112(a-b) can be located on opposite sides of housing 102 and can be used to secure the service box 100 to a desired location in a floor. For example, FIG. 1 illustrates mounting bracket 112a and FIG. 6 illustrates mounting bracket 112b. As can be seen in these Figures, mounting brackets 112a and 112b have arms 114a and 114b that can pivot 90 degrees, so that arms 114a and 114b extend out of and away from housing 102. Mounting screws 113 (e.g., 113a and 113b), in turn, can be used to raise the mounting bracket arms 114a, 114b upward, thereby decreasing the distance between the mounting bracket arms 114a, 114b and the lip portion 104. When the service box 100 is in a desired location, this upward movement of the mounting arms 114(a-b) can compress a floor tile or floor frame between the mounting arms 114(a-b) and lip portion 104 thereby securing service box 100 in place.

Mounting screws 113 can be positioned so that the head portion of the mounting screw is located within a secure chamber (e.g., 120) of service box 100. As discussed more fully hereinafter, positioning at least one of the mounting screws within a secure chamber of a service box can help to ensure that only personnel that have access to a secure chamber can remove a service box from its installed position.

FIG. 1 also illustrates doors 160 and 170. Doors 160 and 170 enclose and provide human access to chambers (e.g., 110 and 120) that are defined within housing 102. Chambers, according to the present invention, can be separated based on confidentiality levels. For example, chamber 110 can be a non-secure chamber and house connector ports (such as power outlets and data connectors) that provide access to networks that require little or no security. Doors that provide human access to a non-secure chamber (e.g., door 160), are referred to as non-secure doors. Chamber 120 can be a secure chamber and house ports that provide access to confidential networks. Doors that provides human access to a secure chamber (e.g., door 170), are referred to as secure doors. Chambers 110 and 120 are discussed in greater detail below, particularly in connection with FIG. 2.

In order to limit human access to a secure chamber, a locking mechanism (e.g., 178) can be operatively associated with the door that provides access to the secure chamber. For example, FIG. 1 shows that secure door 170 includes a lock 178. The type of lock 178 can vary from one implementation to the next. For example, lock 178 can be a keyed lock that is opened with a key (not shown). Other locks can include electromagnetic locks, electric locks, combination locks, touchpad locks, or any other type of locking device that can securely keep the secure door 170 closed when in the locked position.

Those of skill in the art will recognize that doors, according to the present invention, can have various configurations. For example, doors can be configured to substantially cover the entire top portion of a service box. In other implementations, doors can be configured to cover only part of the top portion of a service box. In addition, doors can have hinge pins (e.g., 164) about which they pivot to open and close. In another configuration, doors can be sliding doors that do not include hinges. Moreover, the number of doors associated with a service box can vary from one implementation to the next. For example, a raised access floor service box can include two doors. In other implementations, the raised access floor service box can include more or less doors, depending on, among other factors, the number of networks with different security classifications.

In the illustrated implementation, doors 160 and 170 are hinged doors that have independent hinge assemblies 162 and 172, respectively. The hinge pins in hinge assemblies 162 and 172 can be exposed or they can be protected. For example, hinge pin 164 is exposed on non-secure door 160. On the other hand, the hinge pin associated with secure door 170 is protected by a plate 174 that covers the hinge pin. Plate 174 may be steel or another suitably strong material and can be welded in place around a hinge pin.

In another implementation, hinges can be positioned within the housing 102. For example, housing 102 can partially or fully enclose the hinge pins. Covering the hinge pins with plates, or enclosing the hinge pins within the housing, may help to prevent an unauthorized person from removing the hinge pins and gaining access to a secure chamber within service box 100.

Doors 160 and 170 can also have recessed portions 166 and 176. Flooring, such as carpet or tile pieces, can be cut to fit within recessed portions 166 and 176. Because the door portions that receive the carpet or tile pieces are recessed, the carpet or tile in the doors can be flush with surrounding carpet or tile. Placing flooring within the doors can help to conceal all or parts of the service box in the floor.

Exposed portions of doors 160 and 170 that are not recessed or covered by flooring can have different colors. A door's color can correspond to a level of security of the chamber or chambers that a door is covering. For example, a door providing access to a secure chamber may be red and a door providing access to a non-secure chamber may be black. Among other benefits, this color coding system can facilitate a visual inspection of a service box and help to ensure that a network architect does not make connection errors.

FIG. 1 further illustrates cable entry points 130, 132, and 134. Cable entry points 130, 132, 134 provide access for cables to enter housing 102. (FIG. 5 illustrates cables entering into housing 102 through entry points 130, 132, and 134.) Cable entry points 130, 132, and 134 can be openings, apertures, holes, etc. in housing 102. One will appreciate that cable entry points 130, 132, and 134 can be sized such that cables, including primary cables and power cables, can enter the housing 102. As discussed more fully below, particularly in connection with FIG. 4, each cable entry point can lead to one specific chamber (e.g., 110 or 120) that is defined within the housing 102. This can provide a complete separation of chambers having disparate network classifications.

One will appreciate that the various entry points 130, 132, and 134 can be positioned on various ends or sides of the housing defining the raised access floor service box. Moreover, the entry points may alternatively be located on the bottom portion of the raised access floor service box. The position of the entry points can provide an additional physical security function. In particular, entry points 130, 132, and 134 can be configured so that they can only be accessed if the raised access floor service box is removed from its mounting location.

Positioning all entry points (130, 132, 134) in a raised access floor service box on the same side of the housing, however, can be beneficial. For example, if the service box is the same size as a floor tile, the box can be wired prior to installation. This feature can allow a manufacturer of a raised access floor service box to wire the service box based on the requests of a customer before sending the box out. If the entry points are on different sides of the housing, several floor tiles may need to be removed in order to install the box. Further, depending on the structure on which the service box is to be mounted, a service box that has entry points on different sides of its housing may need to be wired after a network architect has installed the box into the floor.

Additionally, raised access floor service box 100 can incorporate rigid covers 136 that cover a side portion of the secure entry points 130 and 132. These covers 136 can be configured such that once the raised access floor service box 100 is installed, access to the contents of the raised access floor service box 100 through the entry points 130 and 132 is minimized. In alternative embodiments, the raised access floor service box may not have rigid covers 136. In these embodiments, covers 136 may be part an integral part of the housing, such that additional covers are not necessary.

FIG. 1 also illustrates exit points, 180, 182. Exit points 180, 182 allow cables that are attached to a connector port to exit the housing 102. For example, exit points 180 allow cables that are attached to connector ports within chamber 110 to exit chamber 110. Exit points 182 allow cables that are attached to connector ports within non-secure chamber 120 to exit chamber 120. These cables may lead to a specific communication device or other electric device. Like cable entry points (130, 132, and 134), cable exit points can be openings, apertures, holes, etc. into service box 100. In alternative implementations, the various exit points can be positioned on various ends or sides of the service box.

Exit points 180 and 182 on service box 100 are located in doors 160 and 170, respectively. Exit points 180 and 182 are located on the edges of doors 160 and 170 such that when the doors are open, exit points 180 and 182 are also open on one side. This configuration allows a network architect or a user to easily access the cables when the doors are in an open position.

In order for a cable to attach to a connector port within a service box, the cable may need to have a connector plug (e.g., 224 in FIG. 5) attached to the end of the cable. In one implementation of the present invention, exit points 180 and 182 are sized and configured such that the connector plugs on the end of each individual cable cannot pass through the exit points. For example, the connector plugs may be larger than the exit points. This configuration allows for a cable to pass through an exit point, but not the connector on the end of the cable. This could prevent an unauthorized person from pulling a cable out of service box 100. Exit points can be sized and configured in any way to provide this security feature for a variety of different sizes and types of connector plugs. Moreover, the exit points can be limited in size such that human hands/fingers do not have the ability to access the connector plugs or connector ports and affect unauthorized changes to network connections.

Not all exit points 180 and 182 in a service box may have cables exiting the service box. Cap members (e.g., 228 in FIGS. 5, 6) can be inserted into exit points not in use. Placing cap members in exit points that are not in use can prevent objects from being pushed down through the exit points into the housing.

Figure 2:
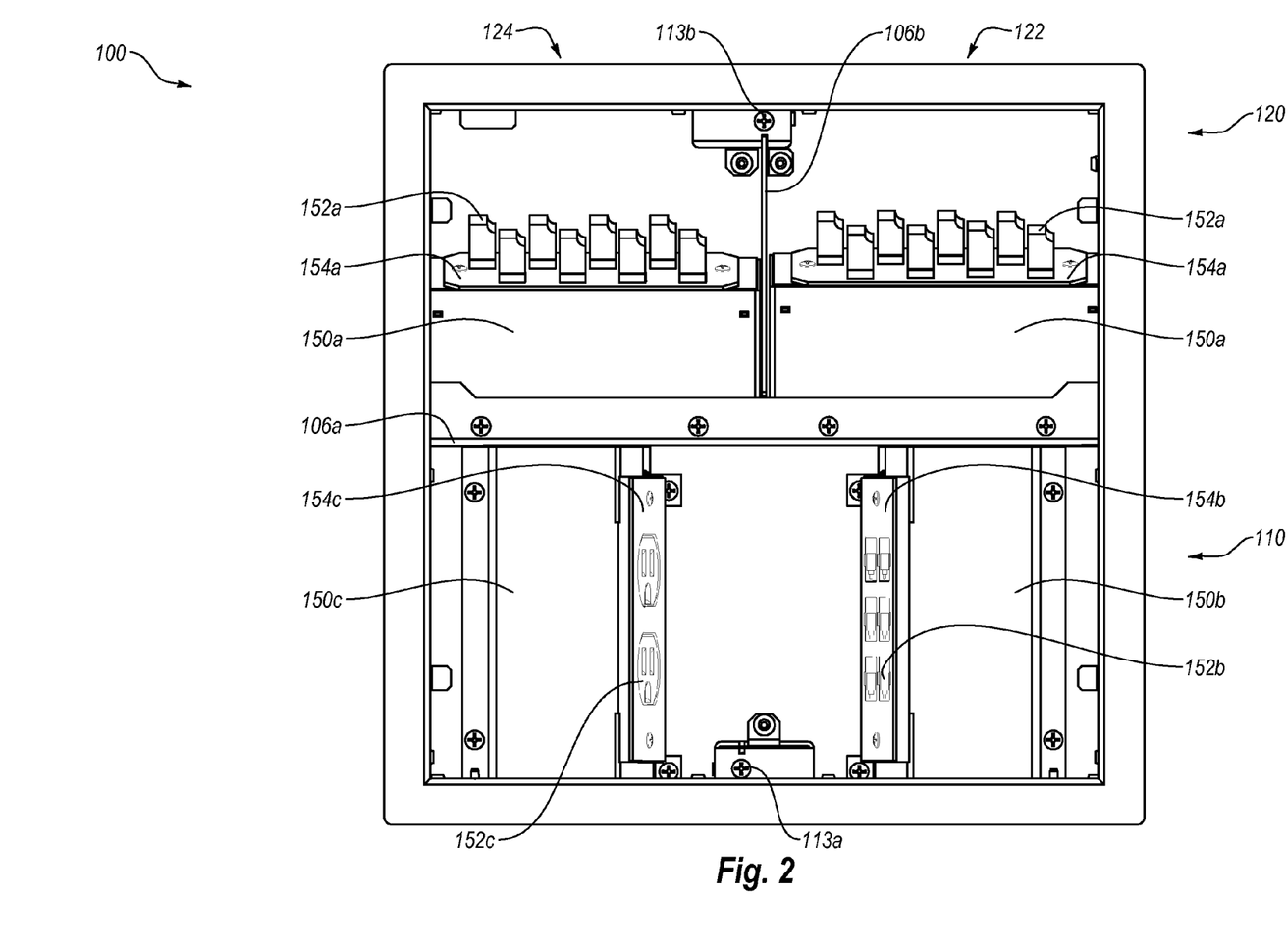
FIG. 2 illustrates a top plan view of the raised access floor service box shown in FIG. 1, with doors removed.

FIG. 2 illustrates a top plan view of raised access floor service box 100 with doors (160 and 170) removed such that non-secure chamber 110 and secure chamber 120 can be seen in more detail. Non-secure chamber 110 is separated from secure chamber 120 by a separation member 106, in this case 106a. A separation member 106(a-b), according to the present invention, can be any device or component that separates two or more chambers within a service box. To this end, a separation member can be made out of steel, or any other material of similar strength and can be permanently secured within a service box (e.g., via welding). Alternatively, a separation member 106 can be removably secured to a service box to allow a network architect to reconfigure and reorganize the size, shape, or number of chambers within a service box as desired.

Separation member 106 can help to prevent unauthorized access, or even someone approved to access one chamber within a service box, from accessing another chamber. Separation member 106 can also prevent any cross-talk or contamination between different chambers within service box 100. For example, having a separation member can prevent cables in one chamber from passing through the space defined by another chamber. A separation member can provide a barrier between two chambers so that the chambers function as if they were within completely separate service boxes.

FIG. 2 shows that separation member 106a separates secure chamber 120 and non-secure chamber 110 into roughly equal sized chambers. FIG. 2 shows in this case that separation member 106a extends between opposing walls of housing 100. Of course, will appreciate that separation member 106 can take on a variety of shapes and dimensions, so long as it is capable of preventing accessing between chambers, or chamber access points.

In one embodiment of the present invention, a separation member 106 (e.g., 106b) can be used to subdivide and further define areas within a single chamber (secure or non-secure). For example, FIG. 2 illustrates an implementation where separation member 106b further defines the secure chamber 120 into two distinct and separate chambers, 122 and 124. The subdivided areas 122 and 124 within the secure chamber 120 allow for an additional layer of classified communications separation. For example, area 122 can house Secret level components, while area 124 can house Top Secret level components.

FIG. 2 also illustrates the heads of mounting screws 113a and 113b. Specifically, the head of mounting screw 113a is within non-secure chamber 110 and the head of mounting screw 113b is within secure chamber 120. In order for a person to tighten or loosen mounting screws 113a and 113b, that person must have access to the chamber where the mounting screw head is located.

FIG. 2 also illustrates connector modules 150(a-c). Generally, connector modules 150(a-c) may convert one or more data or power cables into one or more connector ports (e.g., 152a-c). Connector modules 150(a-c) can be contained within one or more chambers of a service box. For example, FIG. 2 illustrates a set of connector modules 150a within secure chamber 120, and a plurality of sets of connector modules 150b and 150c within non-secure chamber 110. Connector modules 150(a-c) can be configured to include high density connector ports 156(a-c) and low density connector ports 152(a-c). One will appreciate that connector modules 150 can be configured for data, power, or both.

For example, the illustrated connector modules 150a and 150b are data-only connector modules. In this case, these data-only connector modules have high density connector ports 156a and 156b (shown in FIG. 4) and low density or single connector ports 152a and 152b. Specifically, connector module 150a is configured for fiber-optic cables and connector module 150b is configured for copper cables. Connector module 150c is a power-only connector module and has high at least one high power connector port 156c (shown in FIG. 4) and single connector ports (or outlets) 152c. Accordingly, one will appreciate that connector modules 150a-c can provide an interface for a user to supply power or data to a communication or other device.

Service box 100 can be configured to house any number of connector modules 150 and corresponding connector ports as needed. In one specific implementation of the present invention, the housing of a raised access floor service box can have a length and width of about eleven inches, a height of about two and a half inches. With this set of dimensions, an exemplary service box can house twenty-two individual single connector ports. Further, connector ports 152a-c can be mounted to connector modules 150a-c on panels 154a-c. One will appreciate that panels 154a-c can be angled such that a user can easily see and access each of the connector ports 150a-c.

Figure 3:
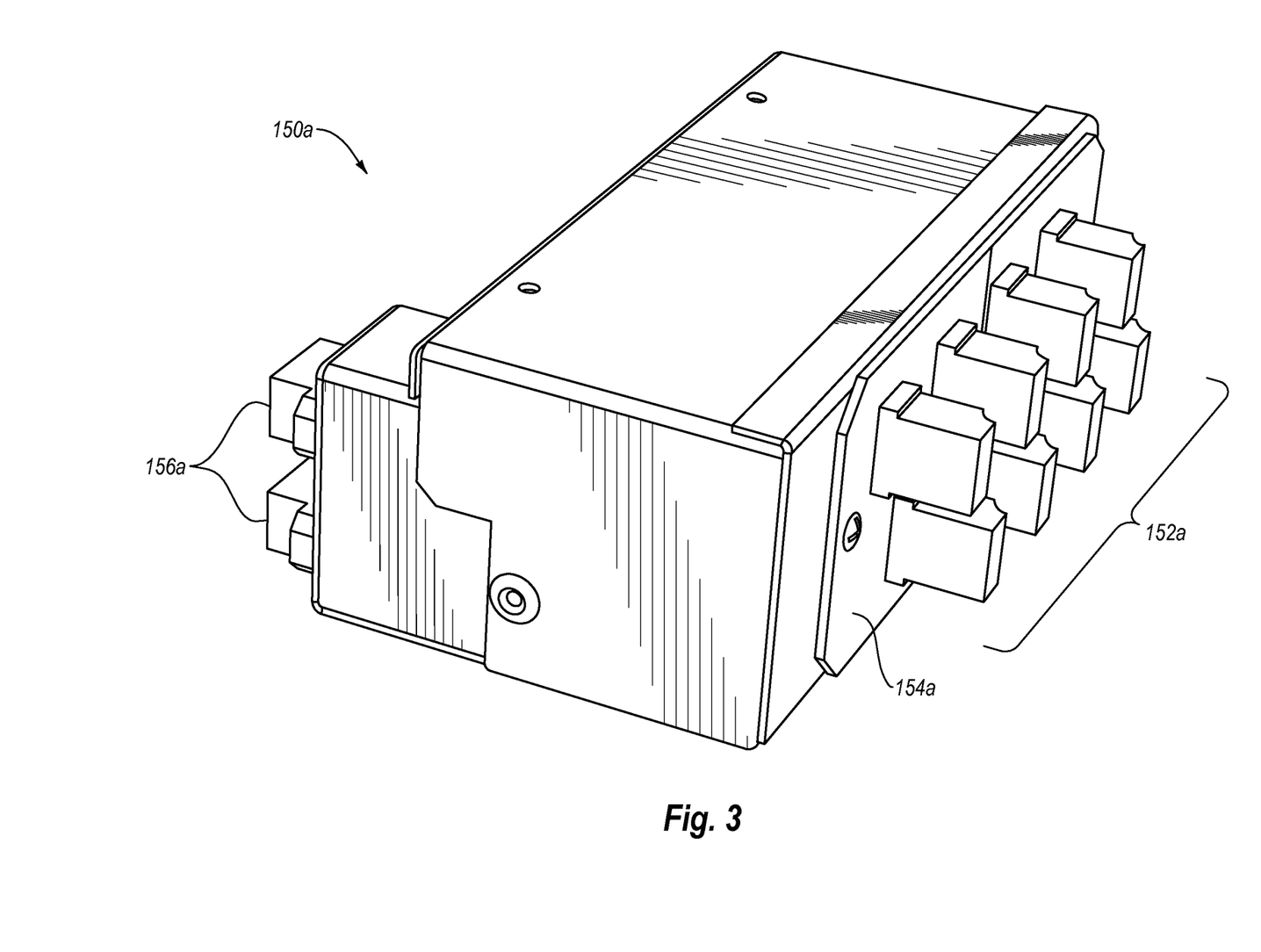
FIG. 3 illustrates a perspective view of a of an exemplary connector module for use with the present invention.

FIG. 3 illustrates in more detail connector module 150a. As can be seen in FIG. 3, connector module 150a includes low density connector ports 152a and high density connector ports 156a. The high density connector ports 156a can be discretely keyed for security separation of classified networks. In one example embodiment, the high density connector ports 156 are MTP/MPO type connectors.

High density connector ports (e.g., 156) can be configured to electrically connect and distribute communication signals to one or more low density or single connector ports (e.g., 152). In one implementation, the low density connector ports can be duplex fiber connectors. In other implementations, other types of connectors or combination of connectors can be used. In one example embodiment, the low density connector ports can be keyed and/or color coded by network type and classification. For example, a connector module can contain up to ten different keys and/or colors for each type of connector. In another implementation, a connector module can include eight low density connector ports. In other implementations, more or fewer single connector ports can be associated with a connector module.

One of skill in the art will recognize that connector modules 150 can be exchanged on-site for a different connector module depending on the user's requirements. For example, a raised access floor service box can be shipped containing one connection configuration, and subsequently, the purchaser can reconfigure the raised access floor service box by removing one or more connector modules that shipped with the raised access floor service box, and replace with one or more new connector modules with different configurations. Moreover, the raised access floor service box can also include modular electrical components such that a user can easily reconfigure the electrical configuration of a particular raised access floor service box without having to rewire the entire raised access floor service box.

Figure 4:
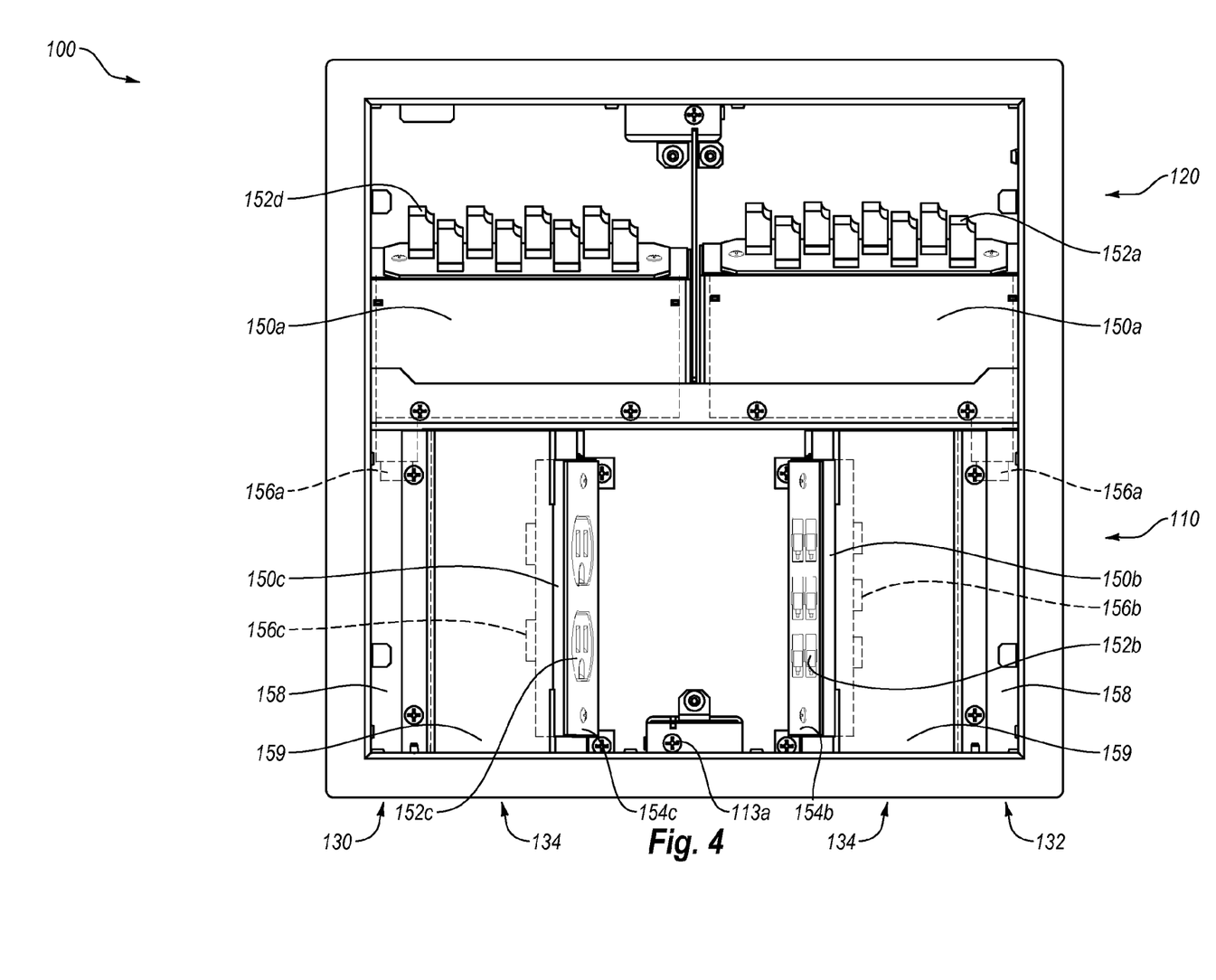
FIG. 4 illustrates a top plan view of a raised access floor service box shown in FIG. 1 with channels and connector modules shown with dashed lines.
Figure 5:
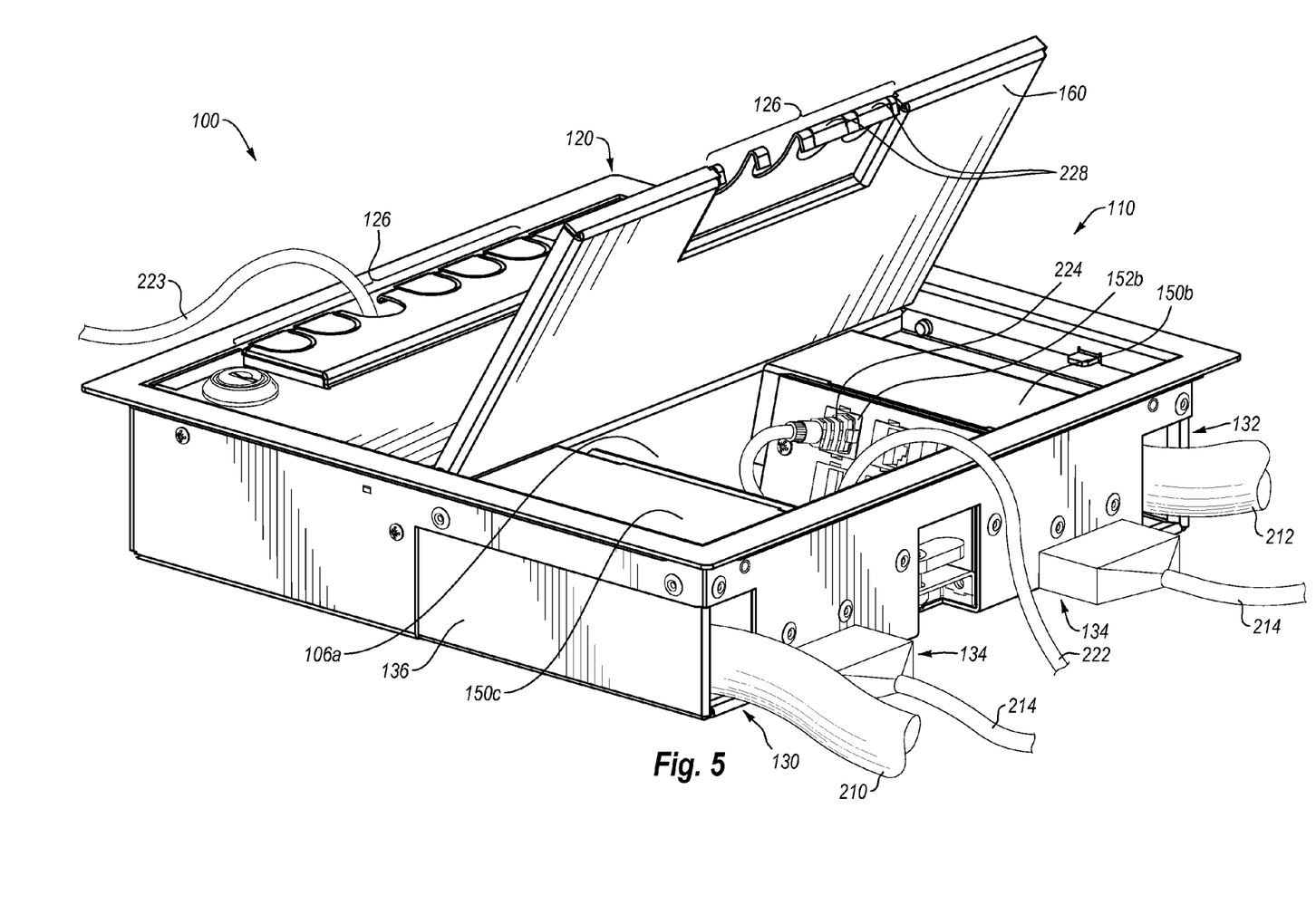
FIG. 5 illustrates a perspective view of the raised access floor service box shown in FIG. 1, with a non-secure door in an open position and with cables entering and exiting the service box.

FIG. 4 illustrates another top plan view of service box 100 with doors removed wherein the connector modules 150a-c with high density connector ports 156a-c are shown in dashed lines within service box 100. Also shown in dashed lines are the channels 158, 159 that cables follow after entering the cable box through cable entry points 130, 132, 134. Specifically, channels 158 lead to secure chamber 120 and channels 159 lead to non-secure chamber 110. As can be seen by the dashed lines, channels 158 and 159 are completely segregated such that a cable entering service box 100 through entry point 130 or 132 cannot access non-secure chamber 110. Similarly, a cable entering service box 100 through entry points 134 cannot access secure chamber 120. This configuration can help to prevent confidential networks from being connected to connector modules in non-secure chambers.

Fiber-optic cables can present unique challenges with smaller service boxes. Fiber-optic cables have a maximum curve radius, which cannot be exceeded in order for data to pass through the fiber-optic wire. According to the present invention, fiber-optic cables can be accommodated by the service box by eliminating any required bend or curve in the cable within the service box. For example, in FIG. 4 a fiber-optic cable can enter the service box through secure entry 130 or 132 and attach to a connector module 150a via connector port 156a through channel 158. Channel 158 provides straight access to connector port 156a such that a cable need not bend or curve at all to connect. This configuration allows fiber-optic cables to be installed in a straight in and straight out arrangement.

FIGS. 5 and 6 illustrate service box 100 when coupled with one or more cables. FIG. 5 shows that a first secure entry cable 210 entering a secure chamber 120 of service box 100 through secure entry point 130. A second secure entry cable 212 enters secure chamber 120 of service box 100 through secure entry point 132. FIG. 5 further shows two non-secure entry cables 214 entering non-secured chamber 110 of service box 100 through non-secure entry points 134. One will appreciate that entry cables 210, 212, and 214 can be fiber-optic cables, copper cables, or another type of data carrying cable, or even, alternatively power cables.

In FIG. 5, door 160 is open thus providing a partial view into non-secure chamber 110. Exit cable 222 is shown connected to connector port 152b through a connector plug 224, which is secured to cable 222 at one end. FIG. 5 also illustrates a second exit cable 223 which is exiting secure chamber 120 through exit port 126. Several of the exit ports 126 are covered with cap members 228.

In FIG. 6, door 170 is open thus providing a partial view into secure chamber 120. Exit cable 223 is shown connected to connector port 152a through a connector plug 225, which is secured to cable 223 at one end. FIG. 6 also illustrates exit cable 222 exiting non-secure chamber 110 through exit point 180.

In alternative embodiments of the present invention, the service box housing may be separated into more than one secure chamber and/or more than one non-secure chamber. In one specific embodiment, all chambers within a raised access floor service box can be secured chambers. Chambers within a housing can have different sizes and dimensions, or all chambers within a service box can have roughly the same sizes and dimensions.

When a raised access floor service box includes both electrical and communication cables, the raised access floor service box can be equipped with an additional EMI (Electro Magnetic Interference) segregation feature such that the EMI from the electrical cable does not interfere with the communication cables located in the same raised access floor service box. Moreover, the raised access floor service box can be provisioned to comply with both North American or UK power requirements, as well as other power standards. Furthermore, the raised access floor service box can provide two levels of electrical power, for example, if the components in a non-secure chamber require different power requirements than the components in a secure chamber.

Accordingly, one will appreciate that the cable box described and claimed herein provides a number of benefits. To begin, the service box of the present invention can be configured to accommodate fiber-optic cables, copper cables, and power cables. The connector ports that provide access to these cables can be limited and restricted from unauthorized individuals. For example, a single cable box according to the present invention can limit human access to confidential networks and while also providing general access to non-confidential networks and power outlets. This may eliminate the need for multiple service boxes where access to networks having disparate securing levels is required.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A service box configured to be mounted within a raised access floor, the service box having at least one selectively lockable chamber, the box comprising:
   a housing that at least partially defines a space, the housing having at least one cable entry point and at least one cable exit point;
   a separation member positioned within the housing that divides the space defined by the housing into at least two chambers, wherein at least one of the chambers is a secure chamber and each chamber defined within the housing is accessible by at least one cable entry point and at least one cable exit point;
   a door operatively associated with the housing and configured to provide human access to at least the secure chamber; and
   a locking device operatively associated with the door providing access to the secure chamber, the locking device being configured to prevent human access to the secure chamber when the locking device is in a locked position.

2. The raised access floor service box as recited in claim 1, wherein housing further includes a lip portion configured for mounting the service box above a true floor.

3. The raised access floor service box as recited in claim 1, wherein all of the cable entry points are located on the same side of the housing.

4. The raised access floor service box as recited in claim 1, wherein each cable entry point provides access to only one chamber.

5. The raised access floor service box as recited in claim 1, further comprising:
   at least one non-secure chamber; and
   a second door operatively associated with the housing and configured to provide human access to the at least one a non-secure chamber.

6. The raised access floor service box as recited in claim 5, wherein:
   each of the doors are hinged doors; and the hinges associated with the door providing access to the secure chamber are protected hinges.

7. The raised access floor service box as recited in claim 5, wherein the doors have different colors that provide a visual signal regarding the security level of the chamber enclosed by each respective door.

8. The raised access floor service box as recited in claim 5, wherein the doors have recessed portions that are configured to receive pieces of flooring that corresponds in size to the recessed portions.

9. The raised access floor service box as recited in claim 1, further comprising a channel that connects the at least one cable entry point with its corresponding chamber, wherein the channel is straight such that a cable entering the service box through the at least one cable entry point need not bend to access the chamber.

10. The raised access floor service box as recited in claim 1 further comprising:
mounting brackets that are configured to secure the service box in a desired location by tightening one or more mounting screws;
wherein, the head portion of at least one of the mounting screws is located in the secure chamber so that it is inaccessible outside of the service box.

11. The raised access floor service box as recited in claim 1 further comprising at least one cap member secured within a hole defined by a cable exit point.

12. A service box configured to be mounted within a raised access floor, the service box comprising:
a housing;
a separation member positioned within the housing; the separation member being configured to separate the space within the housing into a secure chamber and a non-secure chamber;
a secure cable entry point configured to provide access for a cable to enter the secure chamber and a non-secure cable entry point configured to provide access for a cable to enter the non-secure chamber;
a secure cable exit point configured to provide access for a cable to exit the secure chamber and a non-secure cable exit point configured to provide access for a cable to exit the non-secure chamber;
a secure door operatively associated with the housing that is configured to provide human access to the secure chamber and a non-secure door operatively associated with the housing that is configured to provide human access to the non-secure chamber; and
a locking device operatively associated with the secure door, the locking device being configured to prevent human access to the secure chamber when the locking device is in a locked position.

13. The raised access floor service box as recited in claim 12, wherein housing further includes a lip portion configured for mounting the service box above a true floor.

14. The raised access floor service box as recited in claim 12, wherein all of the secure and non-secure cable entry points are located on the same side of the housing.

15. The raised access floor service box as recited in claim 12, wherein:
the secure and non-secure doors are hinged doors; and
the hinges on the secure door are protected.

16. The raised access floor service box as recited in claim 12, wherein the secure and non-secure doors have different colors that provide a visual signal regarding the security level of the chamber enclosed by each respective door.

17. The raised access floor service box as recited in claim 12, wherein the secure and non-secure doors have recessed portions that are configured to receive pieces of carpet that correspond in size to the recessed portions.

18. The raised access floor service box as recited in claim 12 further comprising mounting brackets that are configured to secure the service box in a desired location by tightening one or more mounting screws, wherein, the head portion of at least one of the mounting screws is located in the secure chamber.

19. The raised access floor service box as recited in claim 12 further comprising at least one cap member secured within a hole defined by a cable exit point.

20. A system for providing limited human access to a service box mounted within a raised access floor, the system comprising:
a first cable located in an interior space of a ceiling, floor or wall, the first cable having a first security classification;
a second cable located in an interior space of a ceiling, floor or wall, the second cable having a second security classification; and
a service box comprising:
a housing that at least partially defines a space;
a separation member positioned within the housing that divides the space defined by the housing into a secure chamber and a non-secure chamber;
a secure entry configured to allow the first cable to enter into the secure chamber;
a non-secure entry point in the housing, the second entry point being configured to allow the second cable to enter into the non-secure chamber;
a door operatively associated with the housing, the door being configured to provide selective human access to at least the secure chamber; and
a locking device operatively associated with at least the door that is configured to provide selective human access to at least the secure chamber.

* * * * *

UNITED STATES PATENT AND TRADEMARK OFFICE
CERTIFICATE OF CORRECTION

Page 1 of 2

PATENT NO. : 8,519,276 B2
APPLICATION NO. : 13/114762
DATED : August 27, 2013
INVENTOR(S) : Isaacks et al.

It is certified that error appears in the above-identified patent and that said Letters Patent is hereby corrected as shown below:

On the Title Page, Item [56]
Line 6, change "3/2008" to --4/2008--

In the Drawings
Sheet 4, replace Figure 4 with the figure depicted below, wherein the label 152d is modified to say 152a Signed and Sealed this
Eleventh Day of March, 2014

Michelle K. Lee
*Deputy Director of the United States Patent and Trademark Office*

In the Specification

Column 1
Line 53, change "bundles are into smaller bundles" to --bundles into smaller bundles--

Column 2
Line 1, change "cables that that" to --cables that--
Line 14, change "classifications requirements" to --classification requirements--

Column 3
Line 52, change "to divides the space" to --to divide the space--

Column 4
Line 23, change "of a of an exemplary" to --of an exemplary--

Column 5
Line 24, change "and an individual power lines" to --and individual power lines--

Column 9
Line 42, change "Of course, will appreciate" to --Of course, one will appreciate--
Line 44, change "preventing accessing" to --preventing access--

Column 10
Line 6, change "high density connector ports 156(*a-c*) and low density connector ports" to
    --high-density connector ports 156(*a-c*) and low-density connector ports--
Line 11, change "high density connector ports" to --high-density connector ports--
Line 12, change "low density" to --low-density--
Line 14, change "fiber-optic cable" to --fiber optic cable--
Line 15, change "has high at least one high power" to --has at least one high-power connector port--
Line 18, change "modules 150*a-c*" to --modules 150(*a-c*)--
Line 28, change "ports 152*a-c*" to --ports 152(*a-c*)--
Line 29, change "modules 150*a-c* on panels 154*a-c*" to --modules 150(*a-c*) on panels 154(*a-c*)--
Line 30, change "panels 154*a-c*" to --panels 154(*a-c*)--
Line 32, change "ports 150*a-c*" to --ports 150(*a-c*)--
Line 39, change "MTP/MTO type connectors" to --MTP/MTO-type connectors--
Line 47, change "or combination" to --or combinations--
Line 57, change "connector modules 150" to --connector modules (e.g., 150)--

Column 11
Line 4, change "modules 150*a-c*" to --modules 150(*a-c*)--
Line 5, change "high density connector ports 156*a-c*" to --high-density connector ports 156(*a-c*)--